United States Patent
Kanitkar et al.

(10) Patent No.: US 11,490,307 B2
(45) Date of Patent: Nov. 1, 2022

(54) INTELLIGENTLY PRE-POSITIONING AND MIGRATING COMPUTE CAPACITY IN AN OVERLAY NETWORK, WITH COMPUTE HANDOFF AND DATA CONSISTENCY

(71) Applicant: Akamai Technologies, Inc., Cambridge, MA (US)

(72) Inventors: Vinay Kanitkar, Cambridge, MA (US); Robert B. Bird, Orlando, FL (US); Aniruddha Bohra, Harrisburg, PA (US); Michael Merideth, Raleigh, NC (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 16/440,200

(22) Filed: Jun. 13, 2019

(65) Prior Publication Data

US 2020/0196210 A1 Jun. 18, 2020

Related U.S. Application Data

(60) Provisional application No. 62/778,404, filed on Dec. 12, 2018.

(51) Int. Cl.
*H04W 36/12* (2009.01)
*H04L 67/12* (2022.01)
*H04L 67/10* (2022.01)

(52) U.S. Cl.
CPC ............ *H04W 36/12* (2013.01); *H04L 67/10* (2013.01); *H04L 67/12* (2013.01)

(58) Field of Classification Search
None
See application file for complete search history.

(56) References Cited

U.S. PATENT DOCUMENTS

| 2016/0217388 | A1* | 7/2016 | Okanohara | G06N 20/00 |
| 2017/0195217 | A1* | 7/2017 | Parasmal | H04L 67/289 |
| 2019/0373521 | A1* | 12/2019 | Crawford | H04L 67/146 |
| 2020/0136978 | A1* | 4/2020 | Li | H04L 67/148 |

* cited by examiner

*Primary Examiner* — Mohammed S Chowdhury
(74) *Attorney, Agent, or Firm* — David H. Judson

(57) ABSTRACT

Edge server compute capacity demand in an overlay network is predicted and used to pre-position compute capacity in advance of application-specific demands. Preferably, machine learning is used to proactively predict anticipated compute capacity needs for an edge server region (e.g., a set of co-located edge servers). In advance, compute capacity (application instances) are made available in-region, and data associated with an application instance is migrated to be close to the instance. The approach facilitates compute-at-the-edge services, which require data (state) to be close to a pre-positioned latency-sensitive application instance. Overlay network mapping (globally) may be used for more long-term positioning, with short-duration scheduling then being done in-region as needed. Compute instances and associated state are migrated intelligently based on predicted (e.g., machine-learned) demand, and with full data consistency enforced.

8 Claims, 6 Drawing Sheets

INTELLIGENTLY PRE-POSITIONING AND MIGRATING COMPUTE CAPACITY IN AN OVERLAY NETWORK, WITH COMPUTE HANDOFF AND DATA CONSISTENCY

BACKGROUND

Technical Field

This application relates generally to content delivery and application acceleration using overlay (e.g., content delivery network (CDN)) edge networks.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network.

As applications move more of their processing capability away from an origin (or cloud) and towards the edge, there is a need to ensure that overlay network edge servers are appropriately configured so as to be able to handle processing requirements efficiently. The problem is exacerbated when the client is moving, such as a mobile device roaming within a radio access network (RAN) that is coupled to the overlay network.

Prior art overlay network techniques have been extended to include edge computing, but these techniques typically are deterministic in that edge resources are pre-provisioned or pre-configured. The prior art does not provide techniques that predict edge-specific compute requirements, ensure application instances are pre-positioned on the edge (preferably only where they are required), and/or configure the application instance with a copy (locally) of any necessary state, even as such state is migrating across edge regions (e.g., as an end user client roams across a cellular network).

BRIEF SUMMARY

To address this need, one or more techniques are used to predict edge region/server compute capacity needs in advance and, in response, to pre-position compute capacity in advance of application-specific demands. According to the technique, preferably machine learning (which may be local to the edge region, and then rolled-up in the larger network) is used to proactively predict anticipated compute capacity needs for an edge server region (e.g., a set of co-located edge servers). In advance, compute capacity (e.g., application instances) are made available in-region, and data associated with an application instance is migrated to be close to the instance. The approach facilitates compute-at-the-edge services, which require data (state) to be close to the pre-positioned application instance. Overlay network mapping (globally) may be used for more long-term positioning, with short-duration scheduling then being done in-region as needed. Compute instances and associated state are migrated intelligently based on predicted (e.g., machine-learned) demand, and with full data consistency enforced.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION

Figure 1:
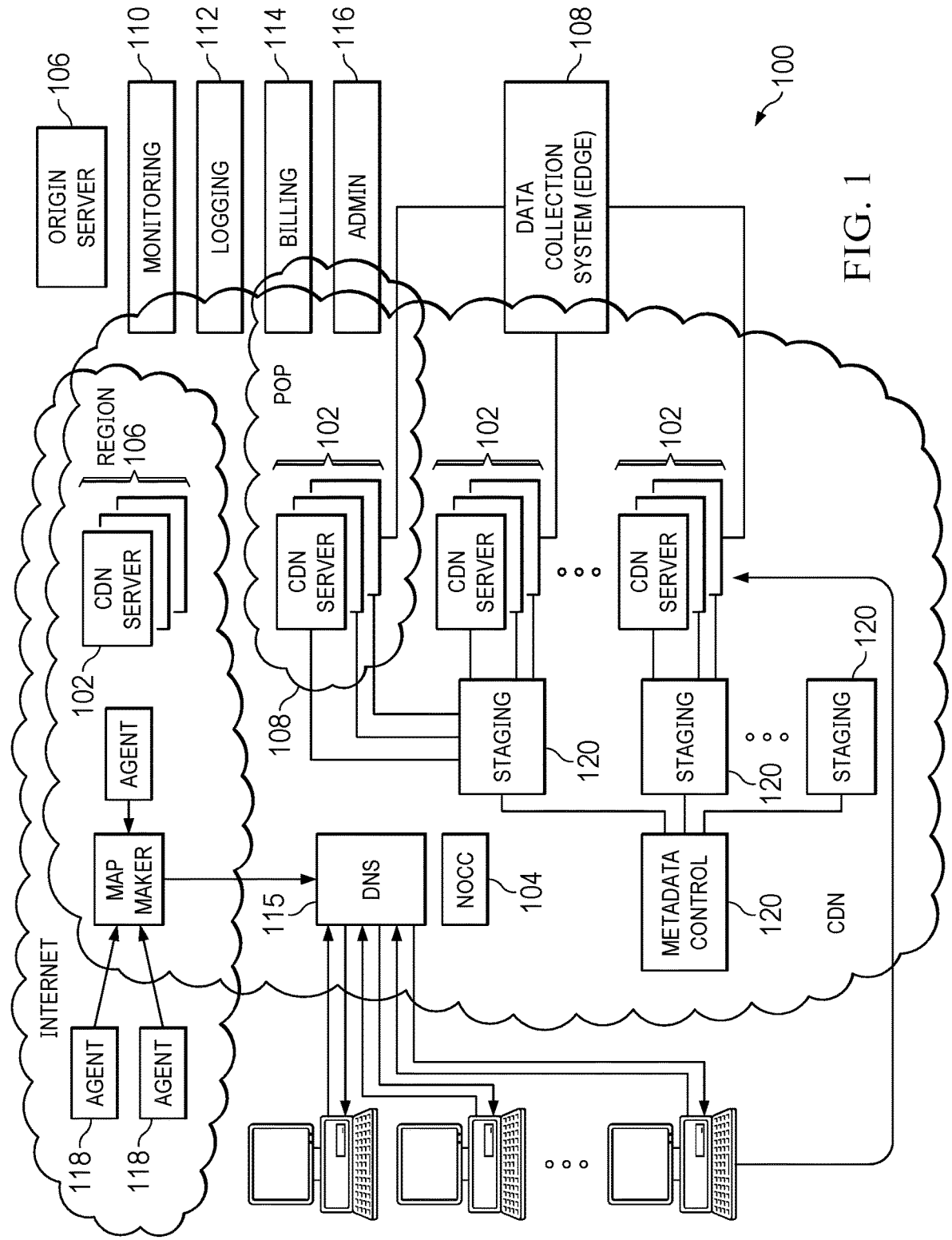
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
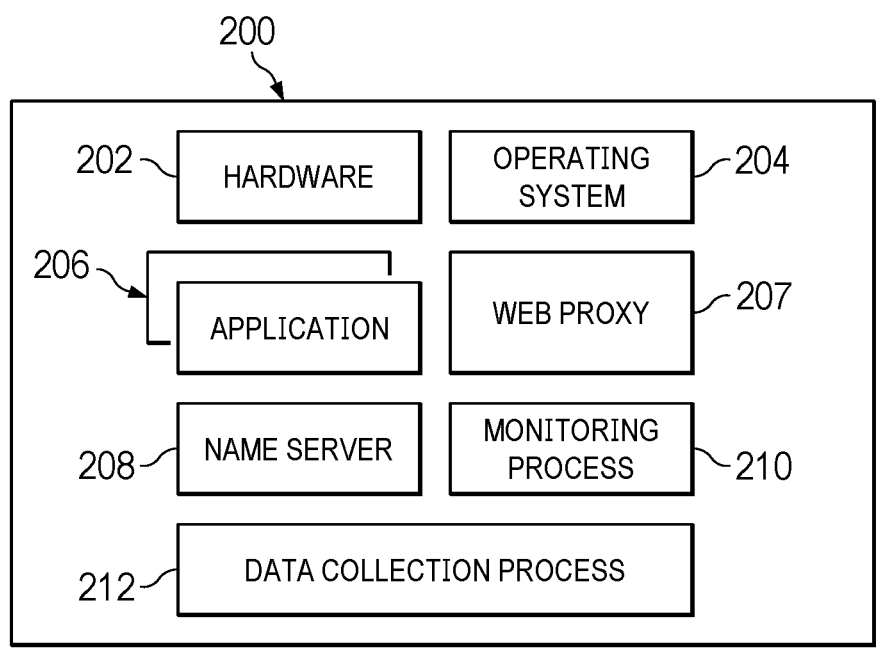
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" process), a name server 208, a local monitoring process 210, a distributed data collection process 212, and the like. For streaming media, the machine typically includes one or more media servers as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Because the CDN infrastructure is shared by multiple third parties, it is sometimes referred to herein as a multi-tenant shared infrastructure. The CDN processes may be located at nodes that are publicly-routable on the Internet, within or adjacent nodes that are located in mobile networks, in or adjacent enterprise-based private networks, or in any combination thereof.

As used herein, an "edge server" refers to a CDN (overlay network) edge machine or server process used thereon. Typically, a "region" is a set of edge servers that are co-located with one another in some physical location (e.g., a network data center rack, a set of co-located machines, etc.).

CDN Support for Edge Compute Capability

Edge compute capability may be supported in the edge network according to one or more known techniques, such as disclosed in U.S. Pat. No. 7,254,634. According to that technique, a content delivery network (CDN) is provided with a distributed application framework, and an application executing in the framework can create, access and modify state for each client. Over time, a single client may desire to access a given application on different CDN edge servers within the same region and even across different regions. Each time, the application may need to access the latest "state" of the client even if the state was last modified by an application on a different server. A difficulty arises when a process or a machine that last modified the state dies or is temporarily or permanently unavailable. The approach described provides a technique for migrating session state data across CDN servers in a manner transparent to the user. In this way, a distributed application accesses a latest "state" of a client even if the state was last modified by an application instance executing on a different CDN server, including a nearby (in-region) or a remote (out-of-region) server.

Another known technique is described in U.S. Pat. No. 7,660,896, which provides a method and system of load balancing application server resources operating in a distributed set of servers. In a representative embodiment, the set of servers comprise a region of a content delivery network. Each server is the set typically includes a server manager process, and an application server on which edge-enabled applications or application components are executed. As service requests are directed to servers in the region, the application servers manage the requests in a load-balanced manner, and without any requirement that a particular application server be spawned on-demand.

One other relevant technique is described in U.S. Pat. No. 7,467,233. This patent describes a method for processing an application on an edge server, wherein the application comprises a set of defined presentation, code and data components, each of which are preferably URI-addressable objects. In response to a client request, the presentation, code and data components are processed according to a set of metadata to generate a response, and the response is delivered to the client. The presentation components are typically content such as HTML fragments, WML fragments, or some combination thereof. The code components are typically Java servlets or beans, XSLT style sheets, or some combination thereof. The data components are typically XML files, native database formatted files, and the like. Each of the presentation, code and data components may have a distinct management profile, cache-ability profile, deployment profile, invalidation profile, and security profile. These profiles are settable via metadata or other similar means. Using this framework, heterogeneous components may be composed into other components and complete applications or services that are provided from the edge server.

Content Delivery Network Interoperability With Clients on Wireless Networks

Figure 3:
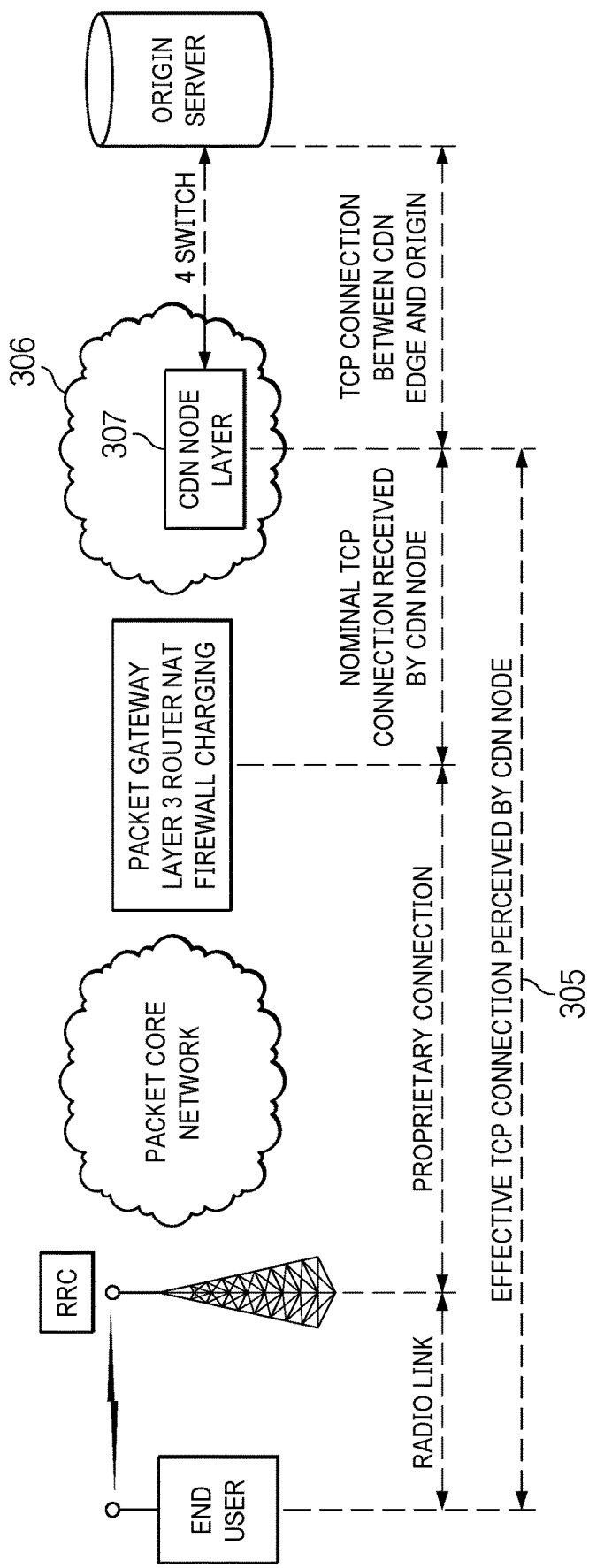
FIG. 3 depicts a content delivery network (CDN) edge node serving clients through a cellular mobile network.

As additional background, FIG. 3 depicts a situation where content from an origin server 300 is delivered to a mobile client 302 through a content delivery network (CDN) 304 (such as depicted in FIG. 1) over a cellular mobile network. This drawing is simplified to emphasize that the client-perceived TCP connection 305 in fact is between the client 302 and CDN edge server 307. The CDN 304 can have a more complicated delivery network structure of course. The CDN edge server 307 is usually located network-geographically close to the packet gateway 306 of the cellular mobile network. This is to minimize the delivery time from the CDN edge 307 to the gateway 306. The drawing also depicts a Radio Resource Controller (RRC) element 308, whose state transitions can have direct impact to the client machine (smart phones, tablets, etc.) and the CDN edge. A radio resource controller (RRC) typically resides in a base station (radio tower), and it is the entity that manages allocation of the radio link between an end user and the base station. In particular, the RRC manages the radio link such that the link between the radio tower and end user is allocated only when needed. Also depicted is the packet core network, which serves the traffic between the RRC and a packet gateway 306. The communication protocols in the packet core network are proprietary in the sense that they are operated in a black box-style, i.e., not exposed to the other network protocol-speaking equipment outside the packet core network. The packet gateway 306 is the interface for the rest of the Internet. It is the intermediary between the packet core network and the Internet.

Figure 4:
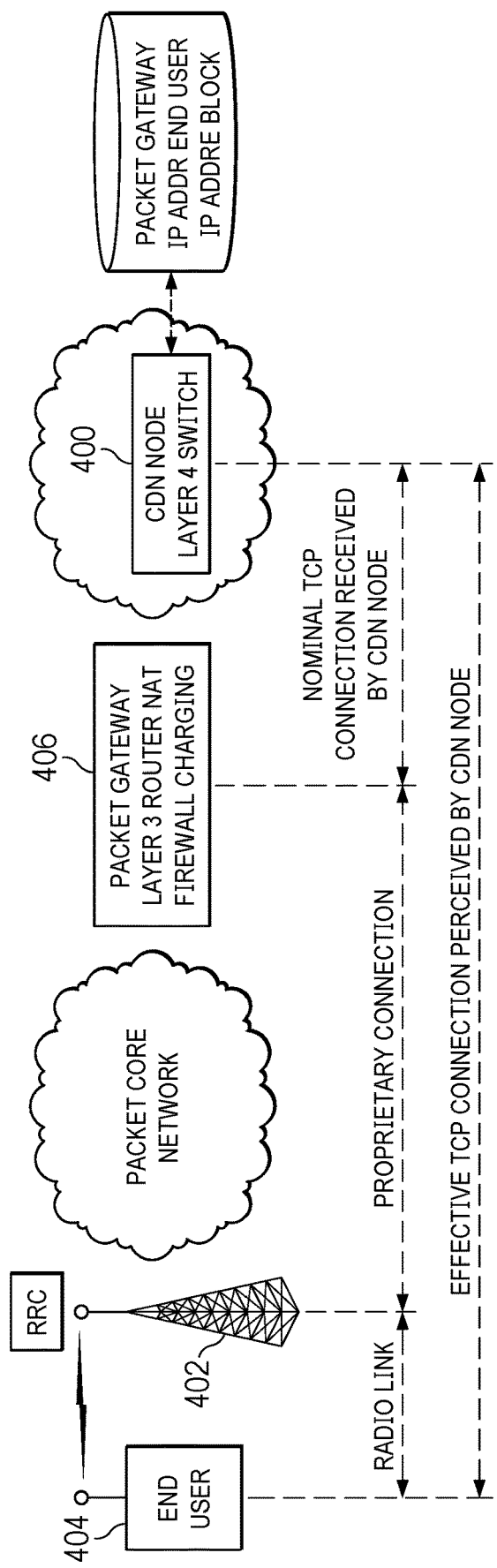
FIG. 4 depicts a TCP connection originating from a cellular mobile network as perceived by a CDN edge node.

FIG. 4 shows a TCP connection originated from the cellular mobile network 402 as perceived by the CDN node 400. In this drawing, and as usual in HTTP-based communication, the effective data flow and transport level connection are initiated by the end user 404. Managing all the IP traffic, a packet gateway 406 runs a network address translation (NAT) function as part of its duties. The packet gateway 406 allocates an IP address and port number to each newly-initiated transport level connection, and it pretends to be the end user towards the rest of Internet. Therefore, the CDN node 400, while receiving the traffic from the end user, perceives that the packet gateway as the end user. Typically, the allocated IP address is from an IP address block that a registrar has assigned to the cellular mobile carrier. Thus, by looking up into a CDN database (e.g., containing IP addresses), the CDN node 400 knows if the source IP address is from the cellular mobile IP address block. Once the CDN node identifies the type of access network, typically it runs its TCP stack with a policy associated to the carrier.

Typically, the end user is a mobile device (e.g., a smartphone, a tablet, or the like), and that device is roaming such that its connection to a particular cell tower in the cellular mobile network is not fixed. To take one example use case, imagine a scenario where a mobile user is performing some activity (e.g. AR/VR, biometric bodysuit, etc.) that is being aided in part by an application that is running on the overlay network edge computing platform, such as described above. In particular, the application is instantiated on the edge network platform as an application instance, and in the usual case where the end user is moving (roaming) with respect to that application instance. As the user moves, according to this disclosure the application instance is migrated to another edge server instance in the platform dynamically. Further, in one preferred embodiment, the application instance is dynamically-migrated together with all of the data (e.g., user state) that the application instance requires to maintain the application processing requirements. By only migrating the application instance if, when and where necessary, the overlay network significantly reduces resource consumption, as resources are then only provided where and when they are needed.

There are many possible use cases that can take advantage of such an operating scenario, namely, edge computing application migration and hand-off. One such use involves an Internet-of-Things (IoT) application instance executing on the edge network and used to support video processing from a moving client, such as a drone. More generally, the technique herein—wherein compute capacity is migrated together with state—may be used to support drone-based access and associated overlay networking. Indeed, the approach facilitates using drones to create a network on-demand, together with the right set of content for that network. Such a drone-based network may also be used to supplement existing networks, e.g., during events, migrations of populations during work hours, and the like.

The approach herein may also be used to support other IoT applications. Thus, e.g., as mobile devices generates data and feed it in through many data collection points, such data collection points may be supported on the edge network. The edge network then provides serialization and validation functions with respect to the data to ensure its accuracy and consistency.

Preferably, the determination regarding where to position an application (or, more generally, a compute instance) is based on a prediction of where demand for that application may arise. In a preferred approach, a machine learning-based technique may be used for this purpose. One such ML technique is now described.

In particular, individual nodes (e.g., edge machines, servers, appliances and devices) in an overlay network (e.g., a CDN) each build local models associated with a particular behavior of interest (e.g., demand for an application or compute instance). Through a gossip protocol, or some other equivalent communication mechanism, nodes exchange some portion of their ML models between or among each other. The portion of the local model that is exchanged with one or more other nodes encodes or encapsulates relevant knowledge (learned at the source node) for the particular behavior of interest; in this manner relevant transfer learning is enabled such that individual nodes (namely, their associated ML models) become smarter. Stated another way, in this scheme a number of "partial" models are in effect built locally, and then relevant knowledge is shared among the machines to facilitate a collaborative, cross-validation of the relevant knowledge-base. Sets of machines that collaborate in this manner converge their models toward some steady state solution that is then used to facilitate the overlay network function or optimization. The exchange of local knowledge among the nodes creates an emergent behavioral profile that is then used to control the edge machine behavior.

Thus, and according to this disclosure, and using the above-described ML technique (or some variant thereof), the overlay network edge network generates a predication of demand for the application instance, and the application instance(s) are then pre-positioned or pre-configured in advance of that demand. A prediction may be based on activity over a given time period, e.g., a day, a week, etc. Any suitable time period may be used.

Figure 5:
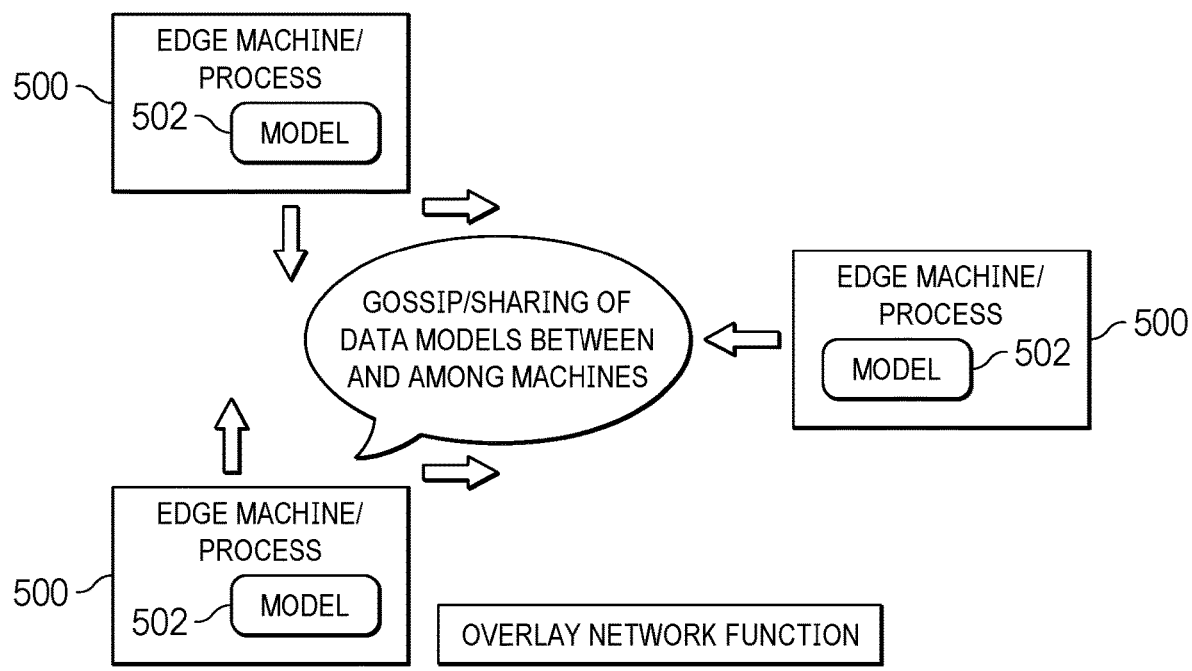
FIG. 5 depicts a set of edge machines that collaborate to share local knowledge to facilitate building a cross-machine model that is then used locally to facilitate a pre-positioning of a compute instance according to this disclosure.

FIG. 5 depicts the basic collaborative machine learning mechanism of this type. In this example scenario, a set of edge machines 500 are provided. The machines act as peer computing nodes in a multi-machine collaborative learning technique. To this end, each edge machine builds a local machine learning model 502 of a particular behavior of interest, in this case anticipated demand for a compute instance. The edge machines communicate these models (or portions thereof) with one another, e.g., by a gossip protocol or other group communication mechanism. Using knowledge obtained from one or more its peers, a machine 500 then adjusts its local model such that the local classification algorithm being executed by a machine is augmented or enhanced by the knowledge that was taken in by one or more of its peers. The notion of adjusting the local model should be broadly construed as updating, modifying, enhancing, refining, rebuilding, and so forth. The machine learning model is then used to facilitate pre-positioning of compute instance(s) across edge nodes, edge node sets, or other groupings, depending on the edge infrastructure.

The above-identified ML technique is not intended to be limited. The demand model generated by a particular edge node in the network may simply be a local model that is not influenced by information received from other edge peers.

Figure 6:
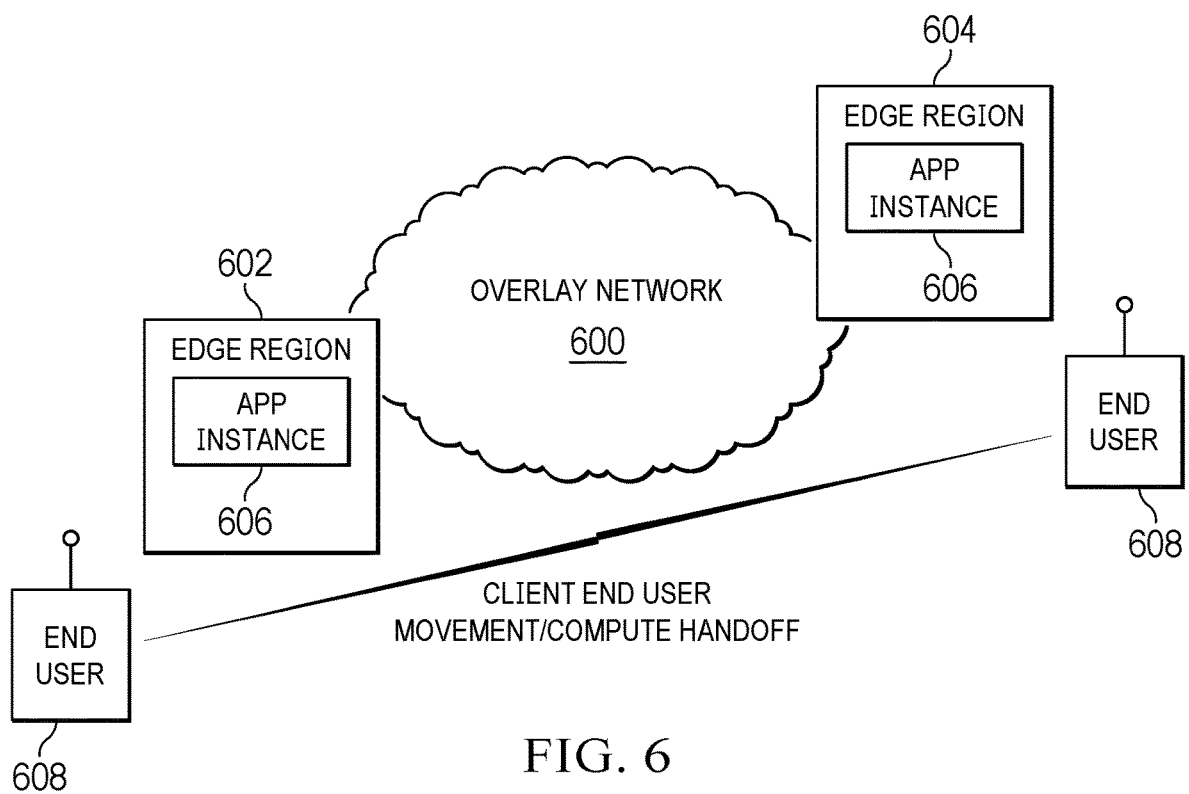
FIG. 6 depicts an embodiment wherein application instances are pre-positioned based on a machine learning model and used to process information on behalf of a roaming end user client via a compute hand-off.

Once demand for an application instance is identified (by machine learning, deterministically, or otherwise), preferably the instance is pushed out to the edge region in advance of the anticipated demand there. In effect, compute instances are spun-up in an edge region (or on an edge server in a particular region) on-demand, and thus such instance is ready to begin processing (in response to a requesting client) as soon as requests are received. FIG. 6 depicts a representative embodiment. In this example scenario, the overlay network 600 comprises edge regions 602 and 604. Application instances 606 are pre-positioned in those regions, typically in advance of demand, and with the particular locations being determined by applying machine learning, such as described above. In this example, mobile device end user 608 begins interacting with the application instance 606 located in edge region 602, but then processing is migrated to the instance located in edge region 604 as the mobile device user is roaming. As depicted, during the move, a compute handoff occurs, and data consistency is enforced.

More generally, and in one aspect, the approach herein thus involves using machine learning to pre-position compute capacity across peers in the edge network, perhaps then using overlay network mapping to fine tune the allocations. Further, a client-to-compute instance association typically has an associated state, and that state is migrated along with migration of the client to another compute instance.

Thus, in one approach, machine learning is used to predict compute demands for a set of edge nodes; based on that predicted demand, compute instances are pre-positioned. Once a client (e.g., a mobile device) is associated with a given compute instance (e.g., using conventional overlay networking DNS), the system tracks any associated state. As the client roams, it then needs to be associated with another compute instance, typically running on some other edge node. As the client moves between compute instances, its state is tracked and then migrated together. In this manner, the edge nodes running the pre-positioned compute instances form an ad hoc mesh network, and the client state becomes embedded in that network as well. This approach may be leveraged by clients that operate according to known protocol schemes, such as 802.11(d), and the edge network may comprise mobile edge components.

In one embodiment, edge components (or, more generally, the compute infrastructure) may comprise Mobile Edge Computing (MEC) elements configured at locations within the cellular network itself, e.g., at a base station, radio network controller, a packet gateway, etc. MEC is a network architecture concept that enables cloud computing capabilities at the edge of the cellular network or at the edge of any network. MEC technology is designed to be implemented at the cellular base stations or other edge nodes, When two instances of compute state are present, e.g., on two distinct edge nodes, preferably a data consistency algorithm also is run to determine which instance state should be used. Thus, some notion of data consistency is enforced to ensure that a given compute instance is associated with an appropriate state.

In a representative embodiment, the data being generated (the state) is supported by an application instance configured to execute at the edge. As used herein, "state" should be broadly construed to cover data associated with a client-application instance interactivity (e.g., the data being processed), and it may also include metadata about the client, the edge server, the connection, the application instance, etc.

As used herein, an application instance and a compute instance are synonymous.

There is no requirement that the client be operating in a radio access network, although this is a typical use case.

The nature and extent of data consistency required depends on the application. The notion is that there is a "state" that should be consistent across application instances as the moving client interacts with the edge network-supported application instance(s). A mechanism that enforces serialization is used for this purpose.

Some portion of the application may also execute in the cloud (or, more generally, centrally). As the client moves, the application (compute) instance in effect moves, together with the state. Preferably, and as noted above, machine learning is used to pre-position the application instances, e.g., upon initialization, or at the very least before any demand for the compute instance is required. The machine learning may track the past movement of the client and/or compute activity, and the learning may then be updated periodically (e.g. daily, weekly, etc.), with the updated learning then applied for future pre-positioning and/or real-time use of the compute instances. A goal is to ensure that the application instance is close to the client, and to ensure that consistent state is associated that application instance as the client-application instance interactivity is occurring.

As another aspect, an optimization function is used to determine where to position the application instance. The optimization function may trade off cost and some performance requirement, with compute instance migration occurring when the function is not met. More generally, the optimization function trades off one or more of: network latency, state latency, compute latency, setup time and location, and combinations thereof.

The techniques herein may combine known overlay network scheduling, together with intelligent pro-positioning and migration of compute instances. Thus, overlay network mapping techniques may be used for long-term positioning, with short-term positioning being based on the machine learning. Using this approach, the overlay network provider can offer its customer some "Function-as-a-Service" (FaaS), conveniently pre-positioned where demand is expected (in terms of overlay network client-to-server mapping). A function may have very low latency requirements, with its core processing being executed on the edge (with little or no dependency or interactivity with a centralized component).

The edge container (that supports the compute instance and the associated state) may be located at an edge server in the overlay, at an MEC appliance in the RAN, and even in the client itself.

As another use case, there may be situations where, due to privacy, confidentiality, legal or regulatory restraints, etc., it is not possible to move data to a location at which compute capability is otherwise located. Where the data cannot move, application-specific demands thus are known in advance and, where necessary, the techniques of this disclosure provide a useful solution, wherein as necessary the compute functionality is moved to where the data is located.

More generally, the technique of this disclosure advantageously move/migrates compute to the data (state), or to a processing location where the state is expected to be (or should be). Typically, moving compute is less costly as compared to moving state.

Another variant scenario involves adapting the compute infrastructure based on activities in the network. For example, consider a monitoring system with a video analysis application that monitors security camera footage for anomalies. In this example scenario, assume the cameras send their video feeds for analysis over a mobile network. If there is sufficient backhaul capacity, it may be desirable to receive all of the feeds at a centralized location (and thus to run the application there), where the feeds can be analyzed. If, however, there is insufficient backhaul capacity, for example, due to another event that requires some of that capacity, then the video analysis software itself is migrated to a convenient analysis location. In this example, the video analysis software is migrated to an edge of the mobile network, and the video feeds are analyzed there. Preferably, this service orchestration occurs automatically, e.g., based on resource needs in the network, time-of-day, or other considerations.

In another variant scenario, application instance(s) and their placement are managed intelligently by an overlay network provider but still in accordance with some customer constraint/requirement. For example, in this scenario assume the customer purchases a right to have up to a given number of instances of its application to be "live" at any moment. In this approach, the system then decides how best to place those instances, e.g., in the best possible edge and centralized location(s), with the goal of ensuring optimal performance for certain users, user groups, etc. The provider then dynamically-migrates the instances around the network, as needed.

The approach herein thus involves pre-positioning and selectively migrating compute instance and associated state intelligently based on demand, and also with data consistency (serialization). More generally, processing occurs in a generic edge container that comprises the compute instance and the associated state.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution. An edge compute instance may be supported in a virtual environment.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system (running TCP) or the like.

The functionality may be implemented with other application layer protocols besides HTTPS, such as SSL VPN, or any other protocol having similar operating characteristics.

The techniques herein may be used irrespective of the traffic type.

There is no limitation on the type of computing entity that may implement the client-side or server-side of the connection. Any computing entity (system, machine, device, program, process, utility, or the like) may act as the client or the server.

Finally, while given components of the system have been described separately, one of ordinary skill will appreciate that some of the functions may be combined or shared in given instructions, program sequences, code portions, and the like.

The techniques herein provide for improvements to a technology or technical field, namely, overlay networking, as well as improvements to the functioning of edge server itself, namely, by extending its conventional functionality as has been described.

Local data collection techniques (for supporting local model building) include, without limitation, active and passive data collection, data traffic monitoring, packet inspection, application layer-based, operating system kernel-based, and otherwise.

As noted above, there may be many different types of machine learning techniques that may be used to facilitate a given collaboration, and more than one technique may be used by given subsets of edge machines that are cooperating or collaborating in this manner. The nature of the data sharing across nodes will depend on the type of model being built. In one embodiment, the machine learning is based on a K-nearest neighbor algorithm. In another embodiment, neural networks are used for the learning.

Having described the subject matter herein, what is claimed is set forth as follows.

The invention claimed is:

1. A method of distributed edge computing, comprising:
configuring application instances on edge nodes of an overlay network in advance of demand for compute capacity on the edge nodes, wherein the demand for compute capacity on the edge nodes is determined by collaborative machine learning wherein at least first and second edge nodes have associated therewith local machine learning models of computing demand that are distinct from one another, and wherein at least the first edge node adjusts its local machine learning model via transfer learning based on the local machine learning model received from the second edge node;
associating a client to a first of the application instances;
responsive to movement of the client, associating the client to a second of the application instances via a compute hand-off; and
maintaining data consistency with respect to interactivity among the client and the first and second application instances;
wherein, for a given edge node, the compute capacity comprises an amount of processing resources sufficient to support one or more of the application instances configured on the given edge node;
wherein at least one of the application instances is latency-sensitive and the client is a mobile device.

2. The method as described in claim 1, wherein the overlay network is a content delivery network (CDN).

3. The method as described in claim 1, wherein the mobile device is roaming in a radio access network coupled to the overlay network.

4. The method as described in claim 1, wherein an edge node of the overlay network provides a mobile edge computing (MEC) function.

5. The method as described in claim 1, wherein the application instances are pre-positioned on the edge nodes where the demand for compute capacity is anticipated based on historical data.

6. A computer program product comprising a non-transitory computer readable medium holding computer program code executable by a hardware processor to facilitate distributed edge computing, the computer program code configured to:
configure application instances on edge nodes of an overlay network in advance of demand for compute capacity on the edge nodes, wherein the demand for compute capacity on the edge nodes is determined by collaborative machine learning wherein at least first and second edge nodes have associated therewith local machine learning models of computing demand that are distinct from one another, and wherein at least the first edge node adjusts its local machine learning model via transfer learning based on the local machine learning model received from the second edge node;
associate a client to a first of the application instances;
responsive to movement of the client, associate the client to a second of the application instances via a compute hand-off; and
maintain data consistency with respect to interactivity among the client and the first and second application instances;
wherein, for a given edge node, the compute capacity comprises an amount of processing resources sufficient to support one or more of the application instances configured on the given edge node:
wherein at least one of the application instances is latency-sensitive and the client is a mobile device.

7. The computer program product as described in claim 6, wherein an edge node provides a mobile edge computing (MEC) function.

8. The computer program product as described in claim 6, wherein the overlay network is a content delivery network (CDN).

* * * * *